(12) United States Patent
Stahl

(10) Patent No.: US 7,237,929 B2
(45) Date of Patent: Jul. 3, 2007

(54) METHOD AND APPARATUS FOR A PROJECTION SYSTEM

(76) Inventor: Thomas D. Stahl, 13183 Aleppo Dr., Sun City West, AZ (US) 85375

( * ) Notice: Subject to any disclaimer, the term of this patent is extended or adjusted under 35 U.S.C. 154(b) by 94 days.

(21) Appl. No.: 10/693,329

(22) Filed: Oct. 23, 2003

(65) Prior Publication Data

US 2004/0207818 A1 Oct. 21, 2004

Related U.S. Application Data

(60) Provisional application No. 60/420,249, filed on Oct. 23, 2002.

(51) Int. Cl.
*F21V 7/00* (2006.01)
(52) U.S. Cl. .................. 362/297; 362/241; 362/346
(58) Field of Classification Search ............... 362/237, 362/240, 241, 244, 247, 297, 298, 328, 346, 362/242
See application file for complete search history.

(56) References Cited

U.S. PATENT DOCUMENTS

| | | | | |
|---|---|---|---|---|
| 2,686,866 A | * | 8/1954 | Williams | 362/231 |
| 5,838,247 A | * | 11/1998 | Bladowski | 362/241 |
| 5,951,139 A | * | 9/1999 | Smith et al. | 362/241 |
| 6,196,699 B1 | * | 3/2001 | Stanton | 362/298 |
| 6,425,677 B1 | * | 7/2002 | Chuang | 362/247 |
| 6,464,375 B1 | * | 10/2002 | Wada et al. | 362/242 |
| 6,527,420 B1 | * | 3/2003 | Chuang | 362/346 |
| 6,796,669 B2 | * | 9/2004 | Masuda | 362/346 |

\* cited by examiner

*Primary Examiner*—Y. My Quach-Lee
(74) *Attorney, Agent, or Firm*—Dickinson Wright PLLC

(57) ABSTRACT

Methods and apparatus for providing a projection system. In one embodiment, the system provides plurality of light sources collimating light using a parabolic concentrator. The system may direct light from a plurality of light sources towards a light collector which directs light towards a fresnel lens which directs light to a polarizing recombiner. The system may also usiethe recombiner to allow light having a first polarization to pass. The recombiner to convert light of a second polarization to light having the first polarization and letting converted light pass to an LCD image panel. In another embodiment, a projection system having a light source capable of achieving a bright, homogenized output is disclosed. The present invention provides such a projection system through at least two embodiments. The first projection system may use a cubic projection system. The second may use a conical projection system.

22 Claims, 11 Drawing Sheets

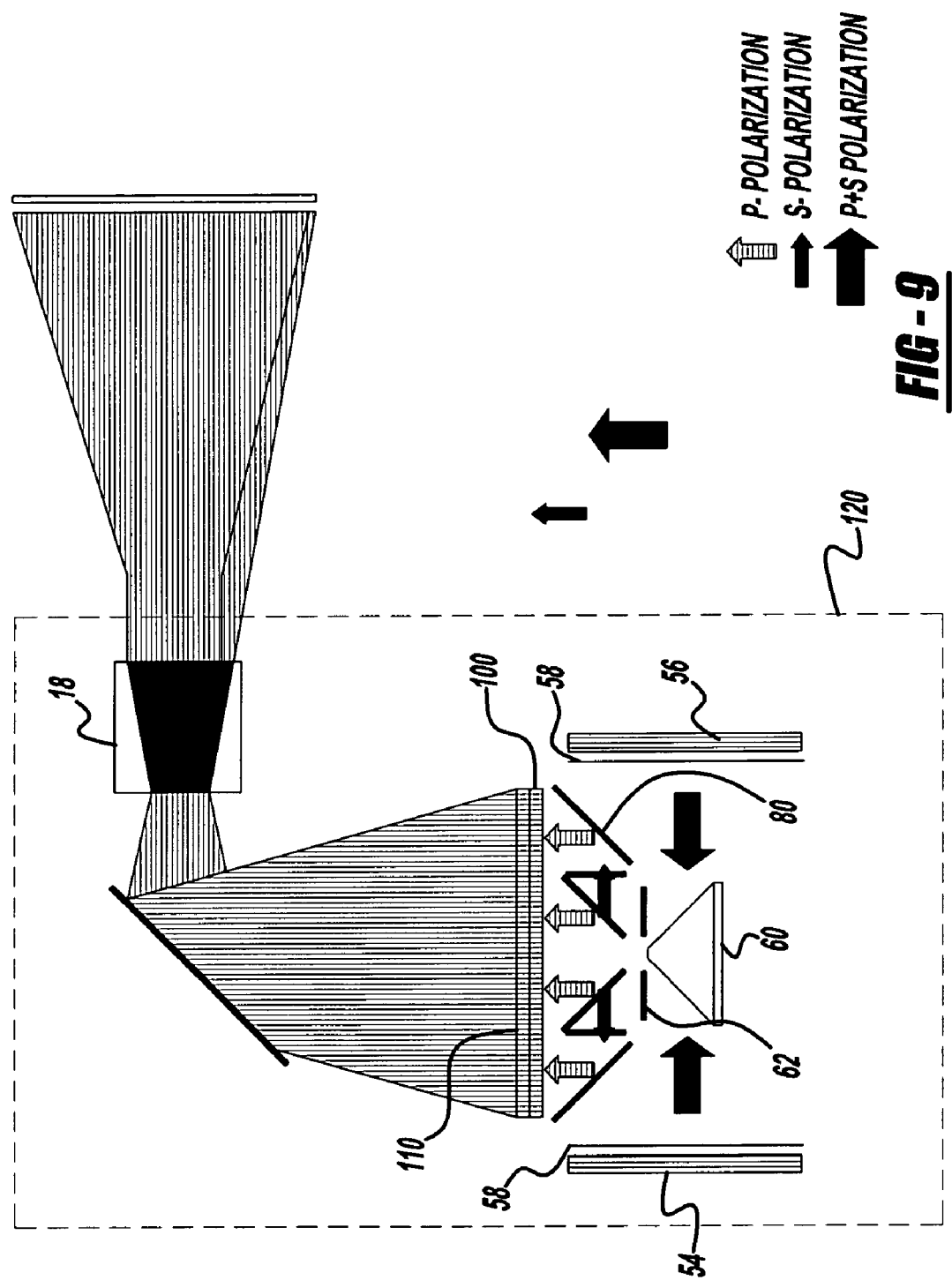

METHOD AND APPARATUS FOR A PROJECTION SYSTEM

CROSS REFERENCE TO RELATED APPLICATION

This application claims the benefit of priority from co-pending U.S. Provisional Patent Application Ser. No. 60/420,249 filed Oct. 23, 2002. This application is fully incorporated herein by reference for all purposes.

BACKGROUND OF THE INVENTION

The present invention relates to projection systems. More particularly, some embodiments of the present invention relate to a projection system having uniform, bright, homogenized output.

Projection systems have been known for some time. Cinema projectors until recently have all been based on analog technology. Historically, Thomas Edison invented a device called the "kinescope", which passed a light through a transparent medium. This device used an electric arc lamp to produce the light required for projection. Because of the size of the arc gap, significant amounts of light were lost and only a very small percentage was usable for the projected image. Modern advancements were mostly mechanical in nature, the film was perforated, mechanisms were designed to carry the film reel in front of the light etc . . . . The nature of the light source, however, did not change until the invention of the Xenon bulb, which is a high pressure glass container with the electrodes inside the glass cavity. Xenon bulbs for cinema today vary in watts depending on the screen size. They range from 2500 watts to 15,000 watts. Their efficiency was greater than the metallic arc lamps as well as a longer life, sometimes as long as 1000 hours. But like the metallic arc, the gap between the electrodes is still quiet wide at 7 to 10 mm. This gap is especially important when one is using a small (less than an inch) imager. The physical principle that limits the amount of usable light is the "optical invariant" or "etendu", which is based on the acceptance angle of the arc gap/reflector relationship to the image plane. The smaller the gap the more light can be captured for the projection imager. All the current digital cinema projectors (TI, JVC, Kodak) use this approach with the xenon arc lamp reflector combination. Unfortunately they cannot over come the optical invariant and like the original Edison metallic arc and lose a significant portion of the usable light. Frequently, these systems are unable to provide a uniform, bright, homogenized output. Such a system remains wanting.

Projection systems using LCD image panels are at a further disadvantage since the LCD panel polarizes light and in do so, rejects 50% of the light that are at the wrong polarization. So immediately, those LCD panels are only half as bright as other image panels and have an additional hurdle to overcome.

SUMMARY OF THE INVENTION

The present invention provides solutions for at least some of the drawbacks discussed above. Specifically, some embodiments of the present invention provide an improved light projection system. Although not limited to the following, such a system is particularly useful in image projection systems. One embodiment of the new approach being proposed in this patent eliminates the need for high power xenon arc lamps as well as by design eliminates the physical limitation of the optical invariant. The proposed embodiment will use all the available light directed toward the image plane with minor losses compared to the xenon/reflector approach. Embodiments of the present invention allow for the desired brightness of white light, the present invention provides a novel solution. At least some of these and other objectives described herein will be met by some embodiments of the present invention.

In one embodiment, the present invention provides a solution for a system that provides a uniform, bright, homogenized output. The present invention provides such a projection system through the use of various devices. A first embodiment may use a cubic projection system. A second embodiment may use a conical projection system.

One embodiment of the current approach uses several unique optical elements to maximize a bright, uniform cinema screen. In this embodiment, the high power xenon arc lamp is replaced with banks of high brightness, low power light emitting diodes. The light from the diodes is captured using a custom designed optical collimator, which in one embodiment, provides an output of no more than about 3 degrees and outputs 95% of the light coming from a light sources such as an LED lamp source. It should be understood that in other embodiments, the collimator may provide no more than 4, 3.5, 3, 2.5, or 2 degrees. It should be understood that in other embodiments, the collimator may provide outputs 90%, 91%, 92%, 93%, 94%, 95%, 96%, 97%, 98%, 99%, and/or 100% of light coming from light sources. Once collimated, the light is easily controlled by other optical components, such as but not limited to fresnel-lens, first surface mirrors, and micro-lens all of which contribute to maintaining a uniform bright source directed to the image plane. In one embodiment, the image plane itself is a large liquid crystal panel with a minimum diagonal of about 9 inches. It is the size of this panel that allows the system to overcome the optical invariant problem of other manufactures. To increase the overall brightness of the system the light passes through a set of unique wire grid polarizers that orient the light to one polarizing component only. Other simple fresnel lens direct the image to the projection lens which then transfers it to the cinema screen. The brightness of the screen is a function of the number of LEDs that we employ at the start of the optical process.

In some embodiments of the present invention, the system uses low power high brightness LEDs as its light source. The LED's are pre-selected or binned for consistent brightness and color.

In some embodiments of the present invention, the system uses parabolic rectangular concentrator having formulas to produce high light output at very small angles. The parabolic reflector may be slightly narrowed at the top (away from the LED) from the parabolic function at the bottom (near the LED).

In some embodiments of the present invention, the system uses custom fresnel lens is used to concentrate and focus the output light from the LED panels.

In some embodiments of the present invention, the system uses a truncated pyramid is used to direct the light toward the image panel.

In some embodiments of the present invention, all optical components in the system are coated with thin films to optimize their performance. The coatings may be used so that all components have the same index of refraction.

In some embodiments of the present invention, the system uses custom fresnel lens to disperse the light in such a manner as to have a totally uniform, bright light for the image panel.

In some embodiments of the present invention, the system uses a polarizing recombiner is used to increase the brightness of the image In some embodiments of the present invention, the projector may repeat the above system, once for each color then recombining using dichroic mirrors.

In some embodiments of the present invention, the system uses an large LCD panel (greater than 9" diagonal) with a resolution of HDTV or greater is used to overcome the problems with xenon lamps and etendu.

In some embodiments of the present invention, the system is optimized for maximum light throughput.

In some embodiments of the present invention, the system comprises any digital projector that uses projection lenses that are liquid filled for low manufacturing cost and very high performance.

A further understanding of the nature and advantages of the invention will become apparent by reference to the remaining portions of the specification and drawings.

DESCRIPTION OF THE SPECIFIC EMBODIMENTS

The present invention provides methods and apparatus for a projection system. Specifically, some embodiments of the present invention provide a solution that allows for improved performance over digital projection systems used today. Embodiments of the present invention allow for increased amounts of light to be directed through an LCD image panel. The improvements in embodiments of the present invention allow for high resolution images and lower equipment costs. Although embodiments of the present invention are well suited for projection of color images onto a display surface, the light projection may also be used in other areas such as street lighting, stadium lighting, or other applications using light projection. At least some of these and other objectives described herein will be met by embodiments of the present invention.

It is to be understood that both the foregoing general description and the following detailed description are exemplary and explanatory only and are not restrictive of the invention, as claimed. It may be that, as used in the specification and the appended claims, the singular forms "a", "an" and "the" include plural referents unless the context clearly dictates otherwise. Thus, for example, reference to "a material" may include mixtures of materials, reference to "a panel" may include multiple panels, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for polarizing light, this means that the polarizing feature may or may not be present, and, thus, the description includes structures wherein a device possesses the polarizing feature and structures wherein the polarizing feature is not present.

The drawings disclose the particular embodiments of the present invention. While, the configurations according to the illustrated embodiment are shown, it is envisioned that alternate configurations of the present invention may be adopted without deviating from the invention as portrayed.

The invention deals with a particular way to configure light sources to achieve a uniform, bright, homogenized output.

Figure 1:
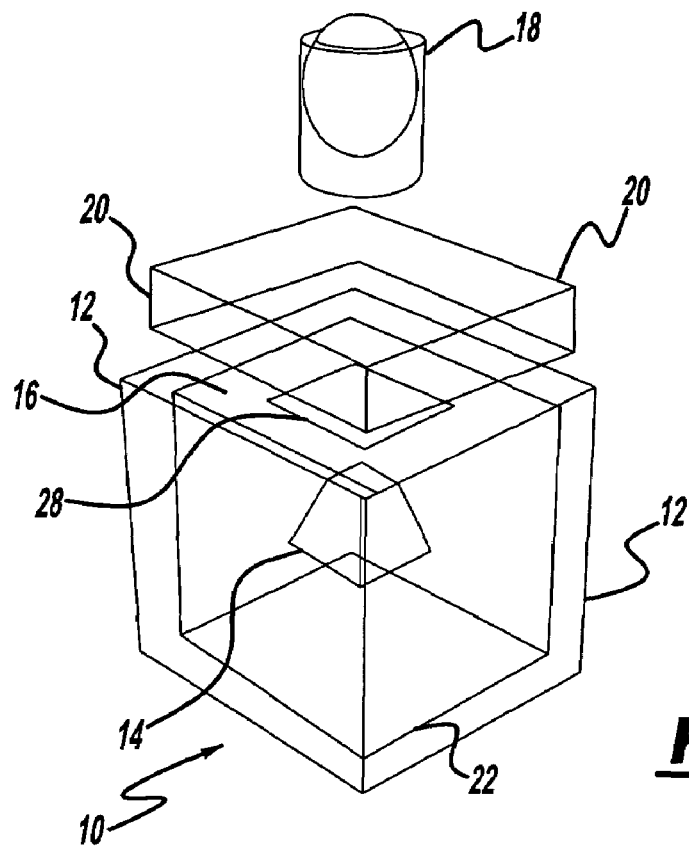
FIG. 1 is a diagrammatic perspective view of the first embodiment of the present invention in the form of a cube.
Figure 2:
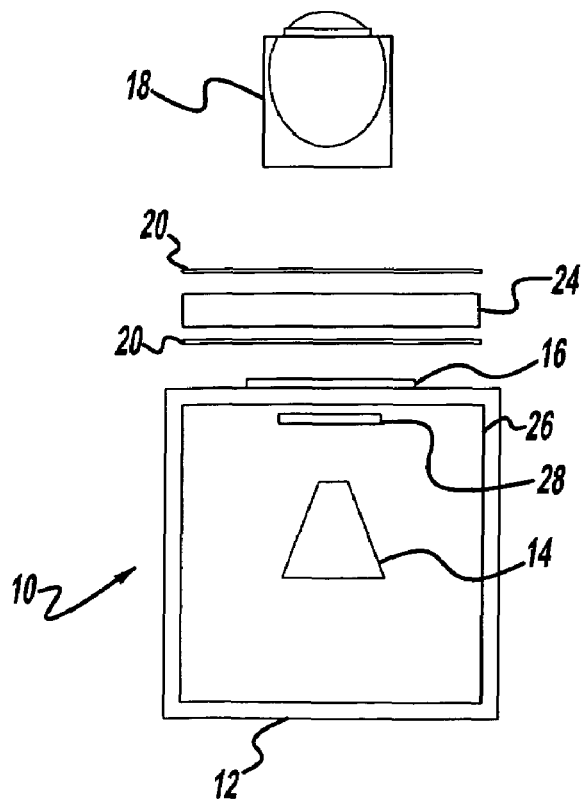
FIG. 2 is a diagrammatic front view of the first embodiment of the present invention in the form of a cube.
Figure 3:
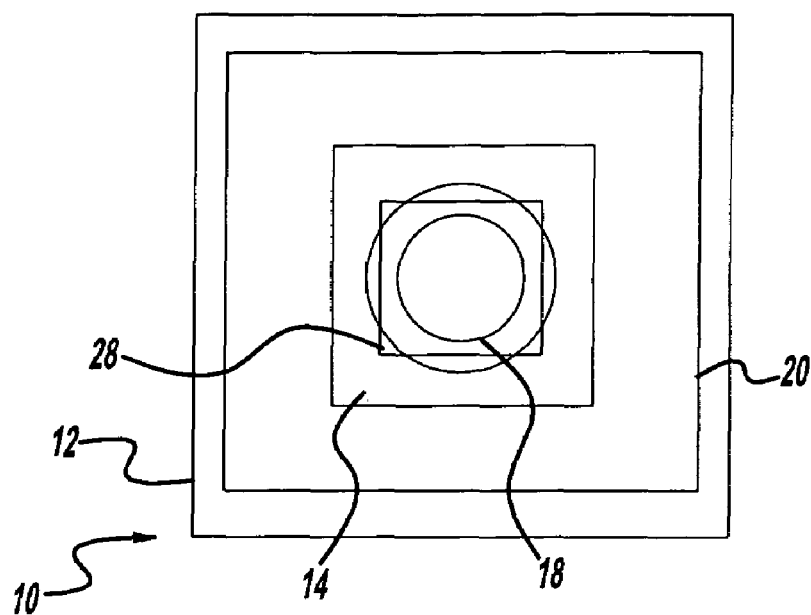
FIG. 3 is a diagrammatic top view of the first embodiment of the present invention in the form of a cube.

With respect to the first embodiment shown in FIGS. 1 through 3, a projection system 10 is generally illustrated. It is understood that a cube has six sides. Referring now to FIG. 1, it is seen that embodiments of the present invention may use the form of a cube with the exception of one side. The present embodiment optionally uses five sides of a cube. Each of the sides, or on the five sides there's mounted, attached or secured in any fashion, light sources 12. The light source may be but is not limited to mercury, high pressure xenon, HID, LED, florescent etc., sources. It should be understood that, in some embodiments of the present invention, any means to produce light will be satisfactory. In the present embodiment, all of these light sources 12 will be mounted etc., on the inside surfaces so that they face each other or they all are directed to the virtual center point inside the cube. They can be directed to the center point of the cube by the method or means of an optical element such as but not limited to a lens, light pipes, or a combination of lens and light pipes. In this embodiment, the center point would then be the focal point of all five light sides of the cube, a virtual point of light made up of the five focal points at one location.

Referring now to FIG. 2, the next element of this optical system is a truncated pyramid 14 located, in this embodiment, at the center point of the light being focused. The truncated pyramid 14 may be but is not limited to a solid or hollow structure whose sides, in this embodiment, are isosceles trapezoids, if only four sides are used. To maximize light output and control the size of the projector it is designed to truncate the pyramid allowing the fifth light panel to focus through the truncated hole in the pyramid. Other applications such as flashlights, bicycle lamps, car headlights may require that the pyramid have more than 4 sides, possibly 6 or 8 to maximize the light output into a single beam. Still further possible shapes include, but are not limited to, two first surface mirrors joined at the top (like a tent), a 3 sided pyramid and a 4 sided pyramid. These sides may be but are not necessarily coated on their exterior surfaces with a highly reflecting coating such as but not limited to a mirror or dielectric designed for the angle of reflection. The purpose of the truncated mirrored pyramid 14 is to direct the collected light from each side of the cube to the open side of the cube illustrated as 12. Pyramid may be made from, but is not limited to, any material (e.g., machined aluminum or plates of glass in a rack). The angles of two opposing surfaces can be any angle such that the LED panels do not mechanically interfere with the other LED panels or the light path of their own or other LED panels.

The material selected for the pyramid is a function of cost, it could be glass, solid metal or a combination. The dimensions are a function of the desired light output. The basic angle contemplated in this embodiment is a pyramid with each side at 45 degrees to the light panel. It should be understood, however, that a variety of angles may used such that the light reflected in uniform collimated flux. Other embodiments of the present invention may use a light collector of other geometries. As a nonlimiting example, a 150 mm×150 mm array of LEDs may have a pyramid with a base dimension of 120 mm×120 mm. Although not limited to the following, the light collector may have one surface for each light source 12 used with the invention.

As previously mentioned, the light sources 12 can be simple light bulbs, high pressure to be used for various applications. The bottom light surface once collected by an optical element is focused through the pyramid's hole made by its truncation. The pattern of light coming out of this structure is that of an X, one center point and one point at each central grid. The light can be then collected by any number of optical elements, a lens, an integrator 16, a light pipe, a diffuser, a holographic diffuser, or any other element that collimates or focuses or diffuses the incoming light for the particular application. Applications are universal, wherever there is a light used today a truncated pyramid 14 light can be used in the future. As a nonlimiting example, some applications may include but are not limited to use as single pixels in displays, as projection lamps, as street lamps, as bicycle lamps, as door lamps, as office lamps, etc. The lamp can also be configured to strobe for use in night clubs, hot tubes etc. for multi-color applications. The unit can also be used as a single pixel for a stadium scoreboard. The applications for bright, uniform, high efficiency, multi-color lamps are endless.

Referring now to FIGS. 1 through 3, in addition to the light source 12, the truncated pyramid 14, and the integrator 16 mentioned above, specific elements for the present embodiment may include, but are not limited to, a projection lens 18, a first fresnel lens 20, a second fresnel lens 22, a flat panel display 24, a third fresnel lens 26, and a polarizing recombiner 28. Alternative embodiments may include, some, none, or any single or multiple combination of these elements. Details of these element are discussed below in further detail starting at the text for FIG. 7.

Figure 4:
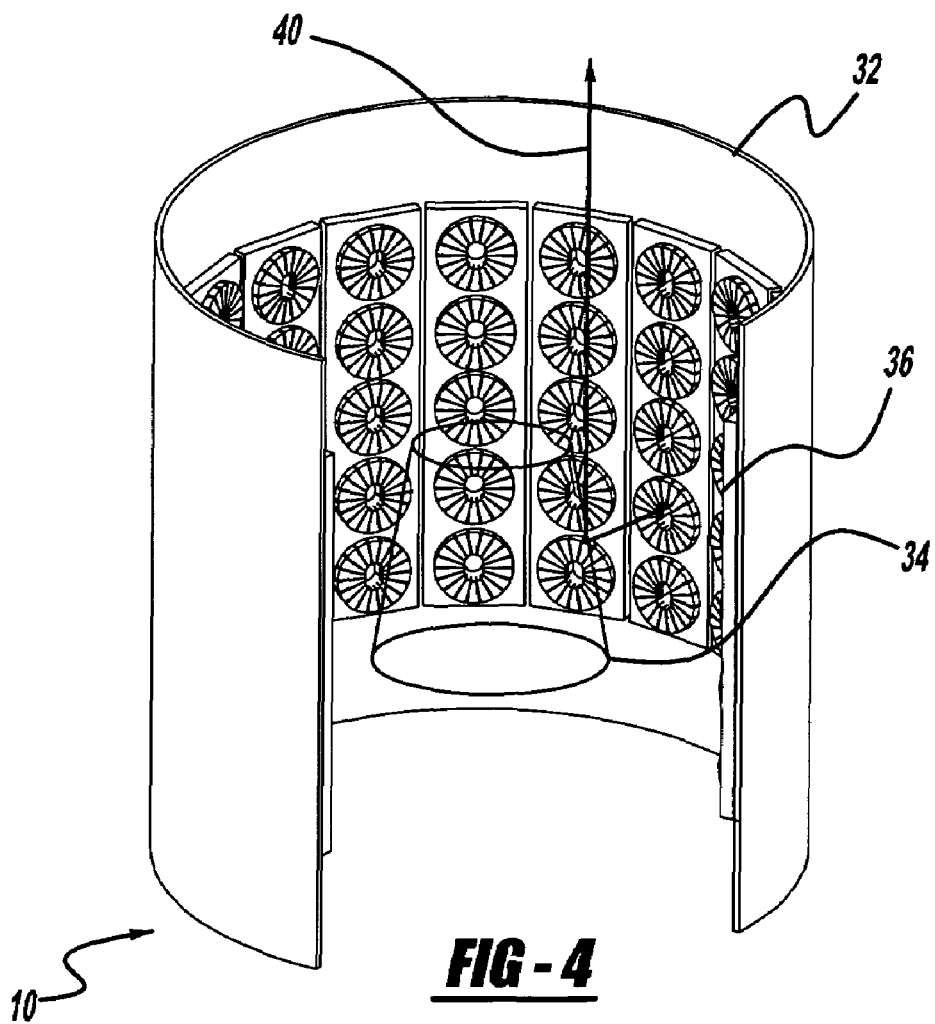
FIG. 4 is a diagrammatic perspective view of the second embodiment of the present invention in the form of a cylinder.
Figure 5:
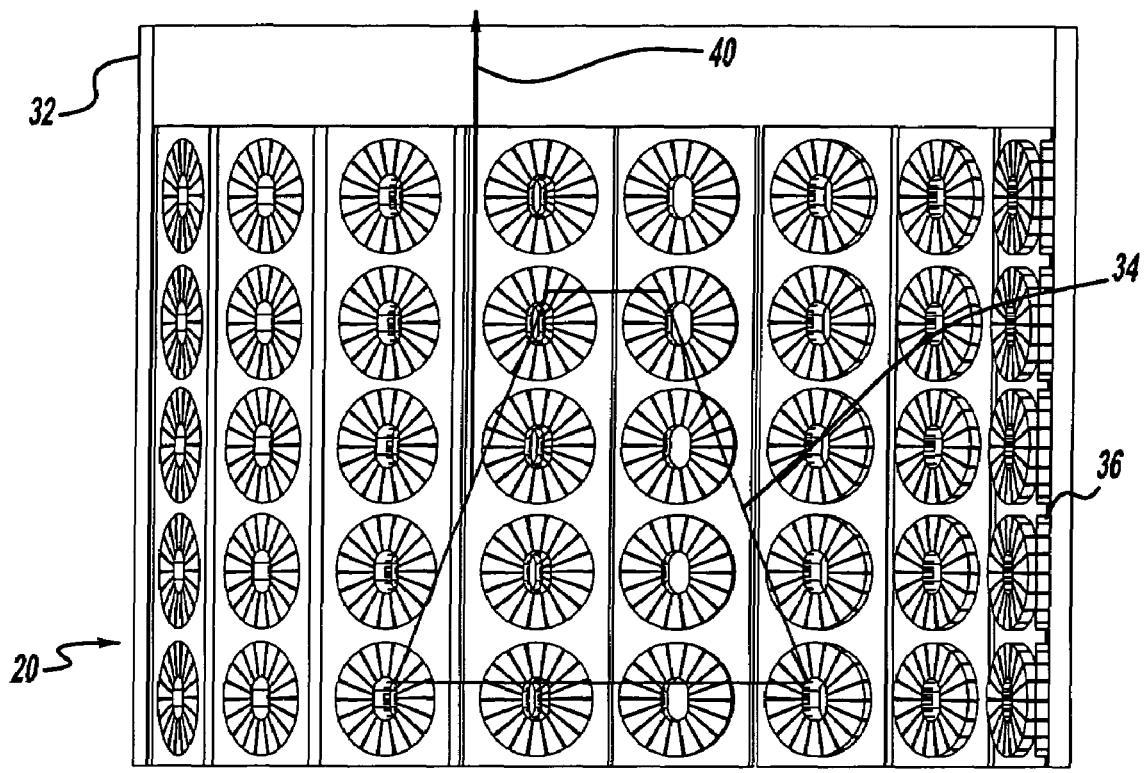
FIG. 5 is a diagrammatic front view of the second embodiment of the present invention in the form of a cylinder.
Figure 6:
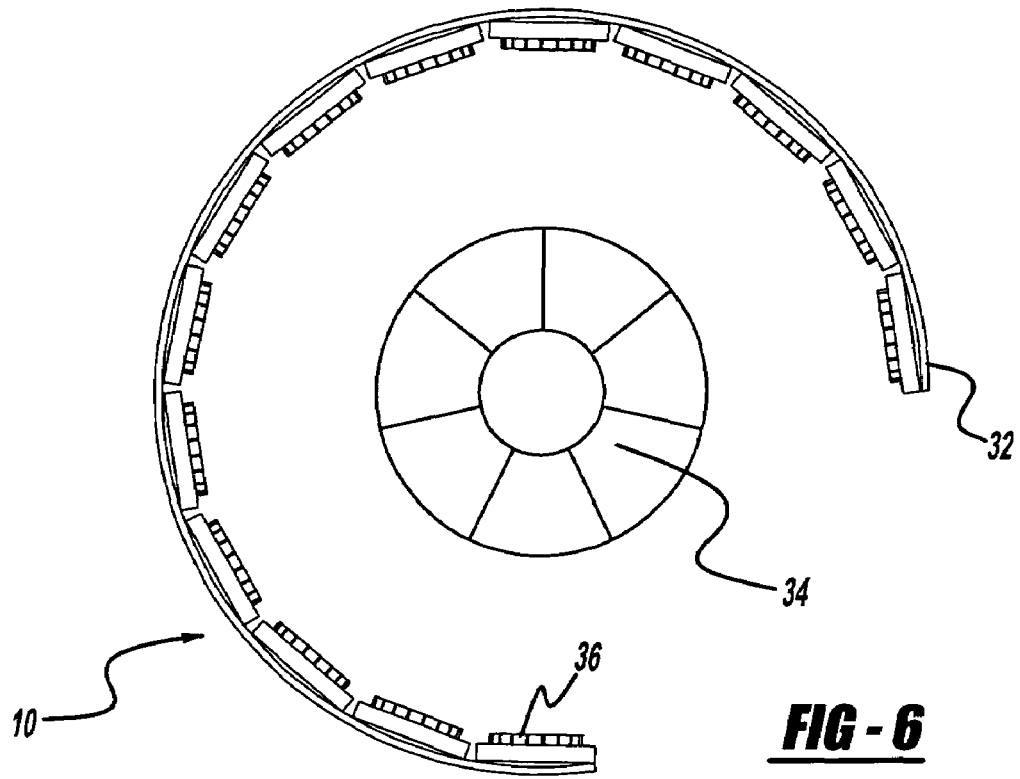
FIG. 6 is a diagrammatic top view of the second embodiment of the present invention in the form of a cylinder.

FIGS. 4 through 6 illustrate a second embodiment of the projection system of the present invention having a conical configuration. According to this arrangement, a projection system, generally illustrated as 30, includes an LED cylinder housing 32, a reflective cone 34, and an LED array 36. (Note that FIGS. 4 and 6 are illustrated with a section taken out for ease of visualization.) The various light sources which in this embodiment is shown as an LED array 36 may direct light at the reflective cone 34 to direct light in the direction indicated by arrow 40. It should be understood that the system 30 may be but is not limited to combined for use with various elements of FIG. 2 by, in one non-limiting example, replacing system 10 with system 30.

Figure 7A:
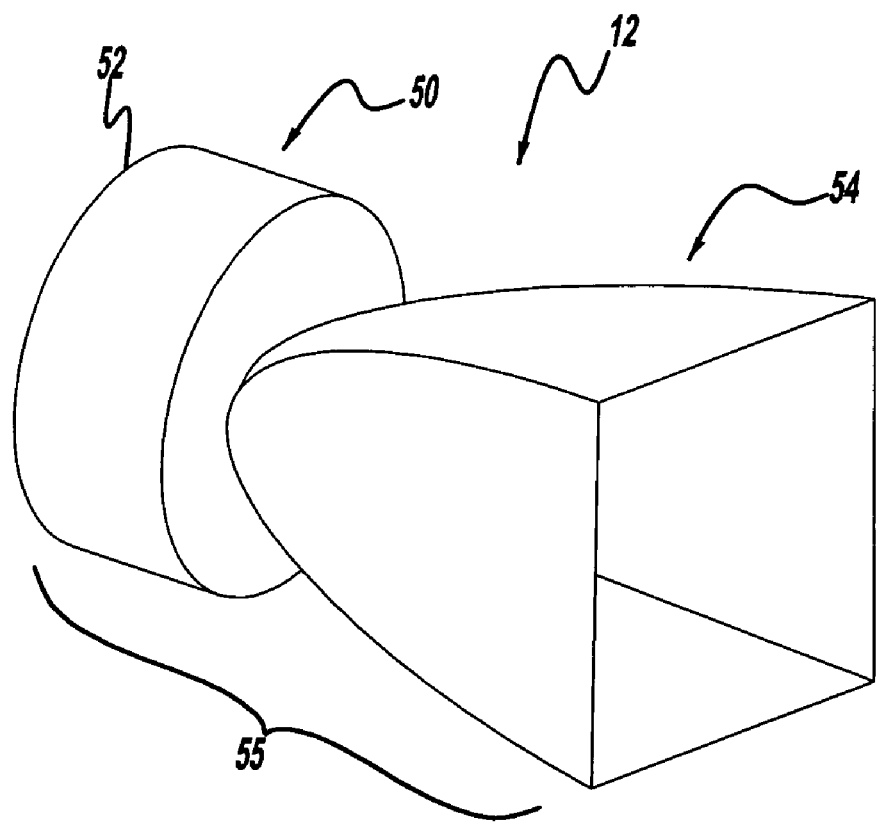
Figure 7B:
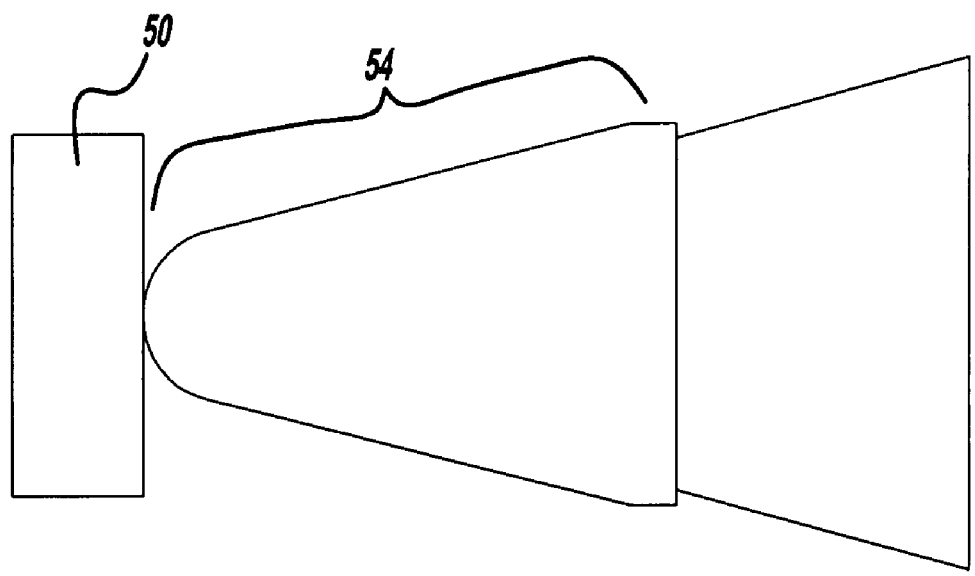

Referring now to FIGS. 7A and 7B as a nonlimiting example, in one embodiment, the light source 12 may be but is not limited to a single LED assembly. This assembly may be but is not limited to the following components—LED light source 50, heat sink 52, and parabolic rectangular concentrator 54 as seen in FIGS. 7A and 7B. The light from the diodes is captured using a custom designed optical collimator 54, which in one embodiment, provides an output of no more than about 3 degrees and outputs 95% of the light coming from a light sources such as an LED lamp source. In one embodiment, the lenses 54 are designed such that the light escapes with an angle of about 4 degrees or less and has minimal etendue within the parabola. In one embodiment, the parabola at the bottom is brought closer to the central axis as it approaches the top of the lens. It should be understood that in other embodiments, the collimator may provide no more than 5, 4, 3.5, 3, 2.5, or 2 degrees. It should be understood that in other embodiments, the collimator may provide outputs 90%, 91%, 92%, 93%, 94%, 95%, 96%, 97%, 98%, 99%, and/or 100% of light coming from light sources.

Though an LED 50 is used in one embodiment, it does not preclude the present invention from using other light sources in place of the LEDs such as but not limited to halogen, lasers, hot cathode etc. The individual LEDs 50 may be pre-selected for consistent color and brightness. The LEDs may project only a single color, multiple wavelengths, white light, or the entire visible spectrum.

Figure 8:
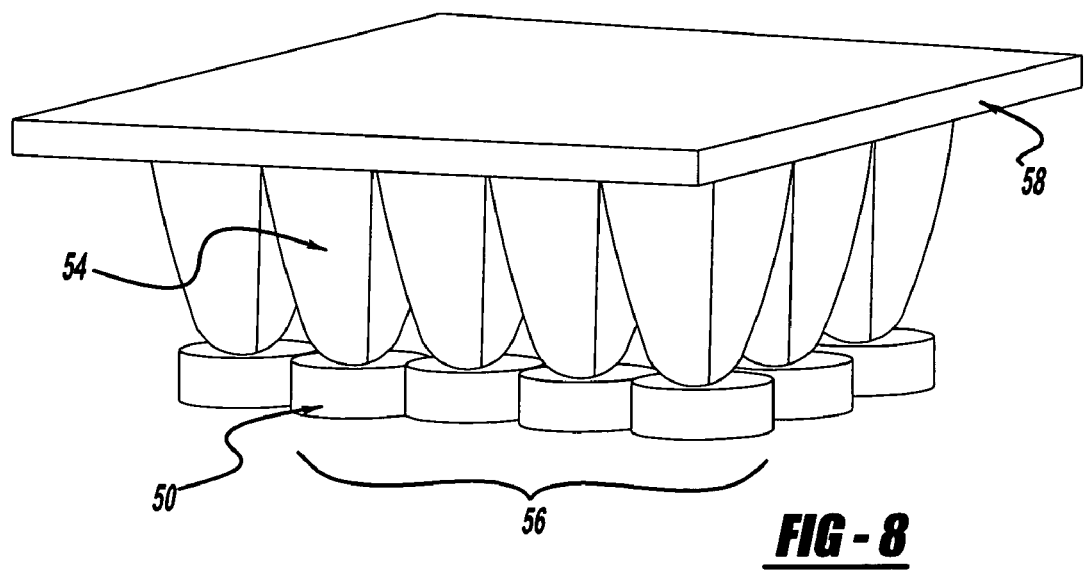

Referring now to the embodiment of FIG. 8, the parabolic lenses 54 may be designed such that they may be but are not limited to being tightly packed in an array 56. The array 56 may be coupled to a fresnel lens 58 which may do a variety of things such as but not limited to focusing light towards a light collector. One embodiment is with a square top, but alternative embodiments may be but are not limited to rectangular, triangular, hexagonal, octagonal, trapezoidal, circular, oval, any other shape, or combinations of the shapes listed. The collimator may be rectangular and use a specific parabolic formula, while other shapes of the collimator can be round, square, oval depending on this and other contemplated applications.

As seen in FIG. 8, each of the LED assemblies 55 can then be assembled into an array 56 which yields a panel of concentrated bright collimated light. In one embodiment, the collection factor has been calculated to be over 90%. This same factor may be but is not limited to higher or lower for alternative light sources such as but not limited to about 75% to 95%. In one embodiment, a sufficiently large array of LEDs will generate sufficient total light for an unmodified LCD and in another embodiment, an LCD combined with an array of microlenses, such that it can project 14 foot lamberts up on screen at 50'. Although FIG. 1 show the light sources 12 positioned for use with a cubic device, other geometries may also be used. By way of example and not limitation, triangular, hexagonal, polygonal, curved, or combinations of the any of the above may be but is not limited to used as configurations for the light boxes used with the present invention.

Referring now to FIG. 9, an overview of the projection system similar to that of FIG. 2 is described in further detail. In this embodiment, the light from the LED panel 56 is then passed to the next optical element, which is a fresnel lens 58. The purpose of this lens 58 in this embodiment is to focus all of the collected light to a light collecting structure 60 such as but not limited to a truncated pyramid structure made of first surface mirrors and coated with specific dielectric coatings to maximize the amount of light reflected from its surface. Although not limited to the following some optical coatings include, Magnesium Oxide, MgF2, Hafnium, HfO2, Silicon Oxide, SiO2, Silicon Monoxide, SiO, Tantalum Oxide, Ta2O5, or Zinc Sulfide, ZnS.

It should be understood that, in some embodiments of the present invention, all optical components are coated or treated so that they all have substantially the same index of refraction. Thus, in addition to light collector 60, all lenses, fresnel lenses, the polarizing recombiner, elements in the recombiner, the image panel, the lense 18, any mirrors used in the projection system may be coated to ensure that the index of the refractions match.

As shown in FIGS. 2 and 9, one embodiment of the light collection system is described. Each side of the pyramid reflects the light from the fresnel toward the image panel. Since the pyramid is truncated light can be captured from 5 LED panels giving the design great versatility when selecting color, brightness and uniformity. If using rectangular arrays of LEDs on each side, the light coming off the truncated pyramid is in the shape of a cross that is then expanded and conditioned further by the next set of optical elements. Using trapezoidal arrays of LEDs, the light is in the shape of a rectangle. Alternatively, the pyramid may only consist of 2 sides (e.g., a pup-tent), 3 or 4 sides (e.g., pyramids) with the LED arrays in corresponding shapes.

Figure 10:
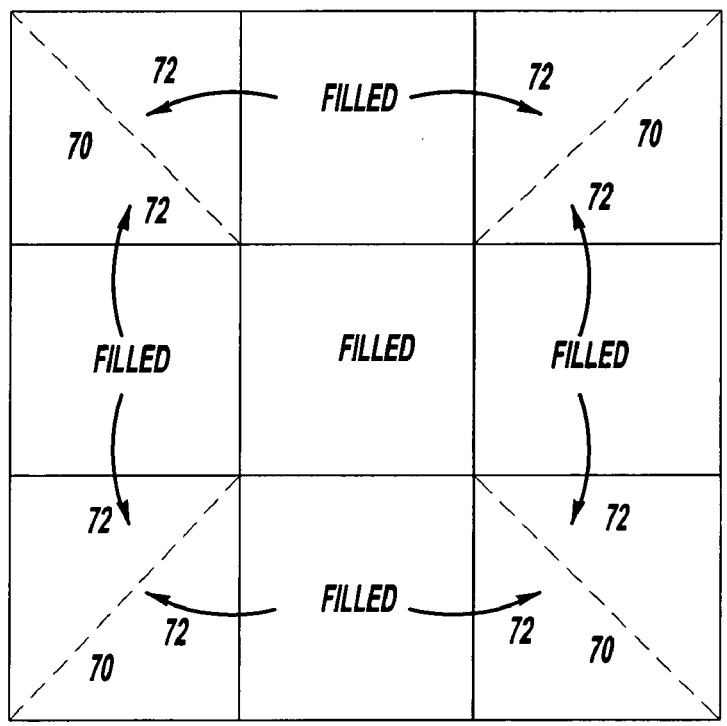

Referring again to FIG. 9, light from the light collection device 60 is directed to an expansion fresnel 62: The light reflecting from the truncated pyramid 60 is coming off these mirror at a specific angle designed into the system. The light may be directed in a direction towards the image panel. The image panel can be thought of as a grid of 9 boxes, squares or rectangles as seen in FIG. 10. In this embodiment, the light coming from the truncated pyramid 14 fills all the boxes except the corners 70, but by introducing an additional fresnel lens 62 between the pyramid and the polarizing element, the angle of light can be expanded so there is overlap (as indicated by arrows 72) between the adjacent center squares, which then fill the corners with the same intensity as the center squares.

Figure 11:
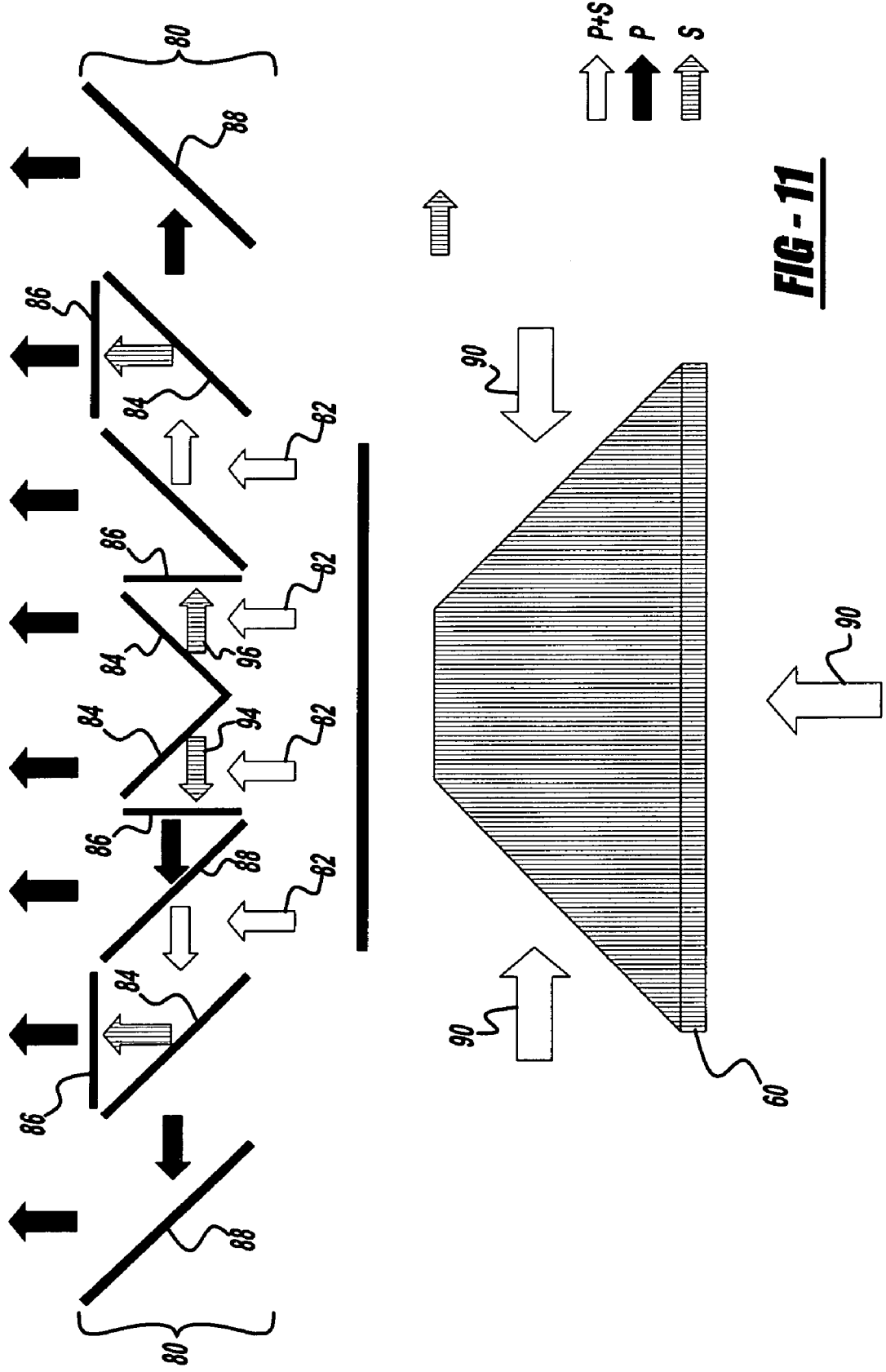

Referring now to FIG. 11, a polarizing device such as a polarizing recombiner 80. The light as indicated by arrow 82 is now uniform coming from the addition of the secondary fresnel to all 9 grid elements. To maintain the lights brightness through the image panel, which in this embodiment is a liquid crystal display with polarizers, the polarization device or recombiner 80 is used. The first polarizer on the LCD should be removed. In its place a newly designed polarizing recombiner 80 is used. This component is made up of wire grid polarizers 84, ½ wave plates 86 and first surface mirrors 88. Unpolarized light is made up of two components commonly know by those in the art as P+S as indicated by arrows 82 and 90. The object of this embodiment of the recombiner 80 is to break these components apart and then twist one or the other to match the first. This embodiment of the recombiner 80 sends light in a left and a right direction as indicated by arrows 94 and 96. This yields light with only one polarization orientation, such as but not limited to P. This recombiner 80 allows all the light to be passed to the LCD without the typical losses found at the first polarizer on the display, which can be as much as 52%.

Figure 12:
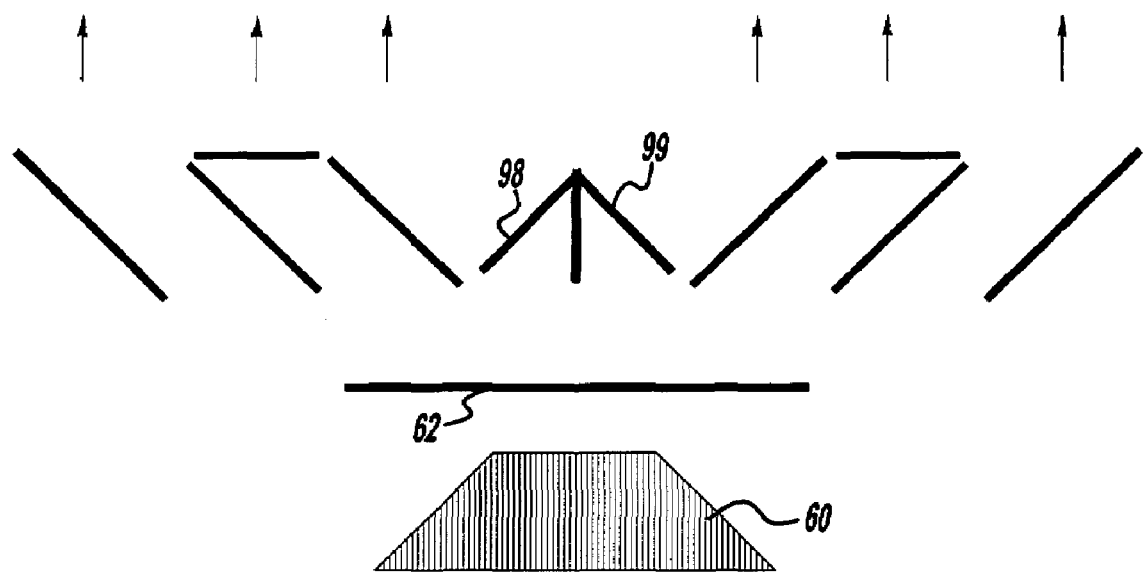

Referring now to FIG. 12, a still further embodiment of the recombiner 80 is shown. Here the wiregrid polaziers 98 and 99 are at angles different than the embodiment shown in FIG. 11.

Referring back to FIG. 9, the light from the recombiner 80 is directed towards an image panel 100. The image panel may be a variety of devices as known in the art. In the present embodiment, the image panel may be an LCD panel of greater than 9" diagonal. It should be understood that in other embodiments, minimum panel sizes of greater than about 10", 11", 12", 13", 14", 15", 17", 18", 19" 20", 21" 22", or larger sizes. Various minimum sizes greater than the diagonals listed above may be used, based on application. These panels may have image areas of various aspect ratios including but not limited to 4:3, 16:9, 1.33:1, 1.39:1, 1.72:1, 1.78:1, 1.79:1, 1.85:1, 2:1, 2.35:1, 2.39:1, or the like. It should be understood, in some embodiments, that the image panel may be selected to project the desired aspect ratio used in motion pictures or movies. The LCD panel may have, but is not limited to resolutions having 1080, 1536, or 2400 lines of resolution. The LCD panel may also have but are not limited to resolutions such as 1920×1080, 2048×1080, 2048×1536, or 3840×2400. Contrast may include but is not limited to 400:1, 1000:1, 1500:1, 2000:1, or 3000:1.

To generate about 4000 to about 15000 lumens of brightness on the screen or a display surface, combining the 8% efficiency of the LCD panel, the light desired to hit the LCD panel should be about 48,000 to about 180,000 lumens. While some of that light is reflected and some is transmitted, the majority is absorbed by the elements of the LCD panel, up to 65 to 240 watts respectively. In office projectors, units that typically have modulators of up to 1.3 inches diagonals, there is a well known problem of LCD and polarizer burnout due to the large amount of power absorbed and heat generated by the relatively small modulators and polarizing elements. However, using a larger LCD panel significantly reduces the power per square inch and consequently significantly reduces the heat and prolongs the lifespan. In one embodiment, using an LCD of 8% efficiency and a 9" diagonal, with a 4000 lumen target brightness (assuming nominal system loss after the LCD panel), absorbs up to about 1.7 watts per square inch. In another embodiment, using a 22.2" diagonal LCD panel at 95% efficiency and 15000 lumens, the panel absorbs up to 2 watts per square inch. In yet another embodiment, using a 22.2" LCD panel and 4000 lumens, the panel absorbs up to 0.29 watts per square inch. If the light path immediately prior to the LCD panel is modified with microlenses and holographic or other elements to separate and focus the light through a sub-pixel, the light may be lowered by a factor of up to 12, but the wattage on the sub-pixel element will be reduced only by a factor of 4 as the potential light will impinge on the sub-pixel. Embodiments of the present invention may be designed so that the LCD panel does not absorb more than about 10, 9, 8, 7, 6, 5, 4.5, 4, 3.5, 3, 2.5, 2, 1.5, 1, 0.75, 0.5, 0.4, 0.3, 0.3, or more than about 0.2 watts per square inch.

Referring again to FIG. 9, a fresnel lens 110 (20 in FIG. 2) may be mounted between the polarizer recombiner and the image plane of the LCD. This component acts as the image carrier to the projection lens. An additional lens maybe required on the top surface of the image plane as well to improve quality, uniformity and brightness.

As seen in FIG. 9, depending on the venue, size of screen and distance from projector to screen a set of lens 18 can be designed as part of the system which will give the best image quality. In some embodiments, these lenses can be fabricated in plastic or glass and filled with liquid to provide versatile manufacturing at a very low cost. In a still further embodiment of the present invention, liquid lenses may be used with the current or other digital projector systems. They may also be adapted for use in known film projector systems. In one nonlimiting example, the projection lens system comprises of the standard glass lenses replaced by liquid lenses. The liquid lenses may be two (2) layers of glass or optically pure plastic (for the visible wavelengths) that have been heated and sagged into molds or molded to form the outside surface of the lens, with the interior of the lens a liquid or semi-viscous material that has the same index of refraction of the glass or plastic outside.

As seen in FIG. 9, the entire projection system may be contained in a projector housing 120. A housing 122 may be used for positioning the LED panels.

Figure 13:
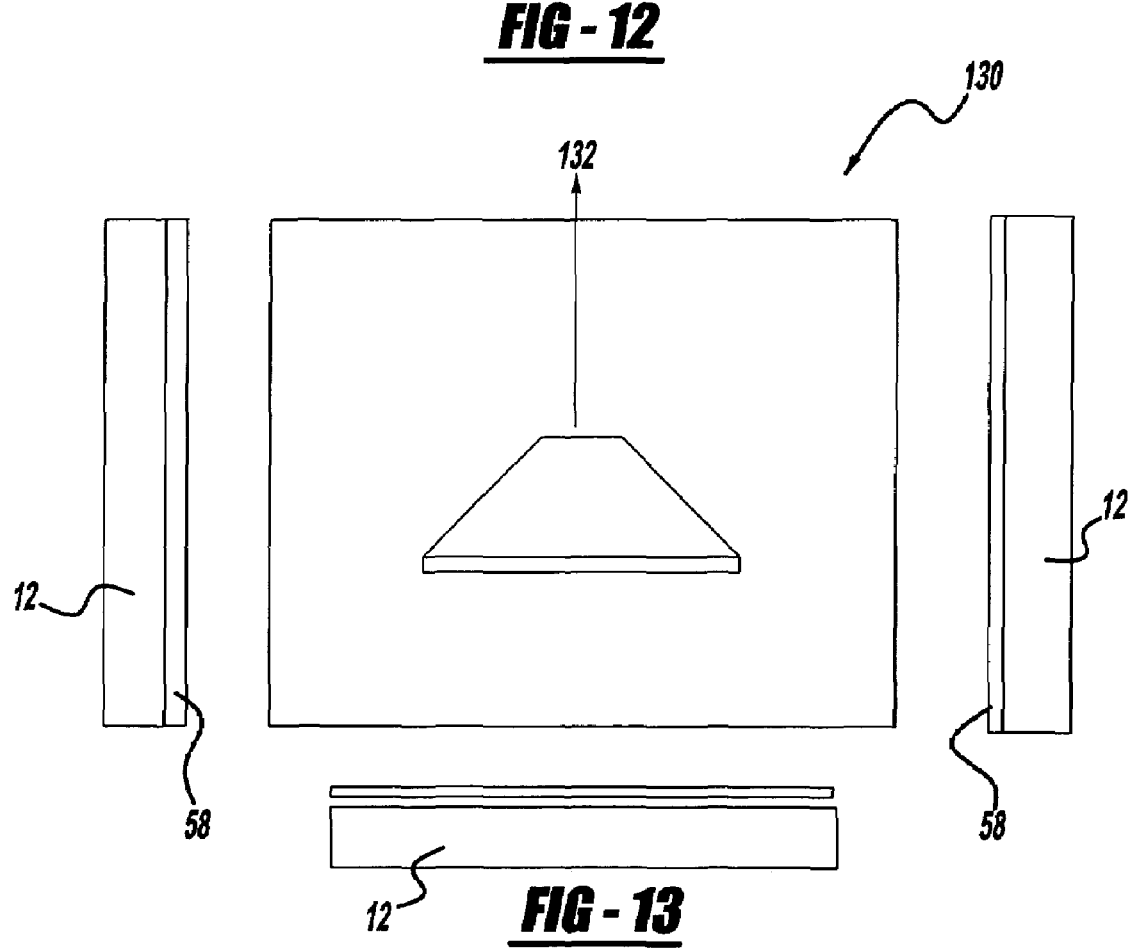

Referring now to FIG. 13, a side view of one embodiment of a light collection system 130 is shown. A plurality of light sources 12 are shown, including one on the bottom surface to directly light directly upward. As seen in FIG. 9, these sources 12 may be LED panels 56. They may include fresnel lenses 58. Some dimensions for one particular embodiment are shown. The light is directed towards a direction indicated by arrow 132.

Figure 14:
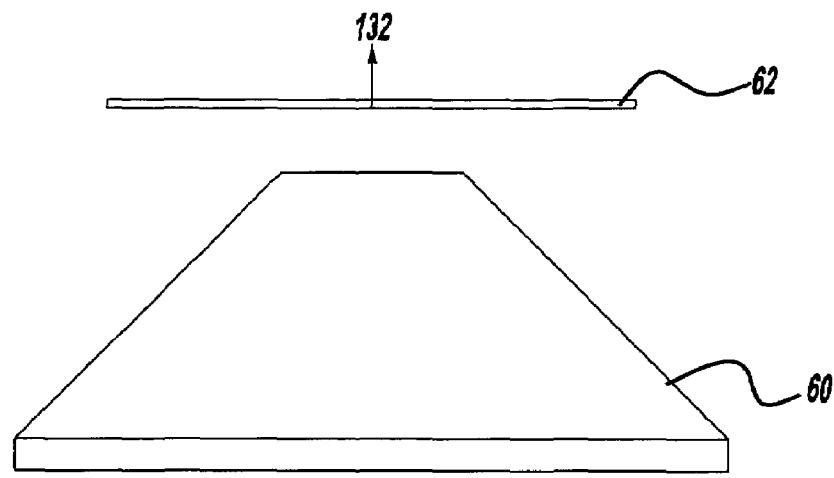
Figure 15:
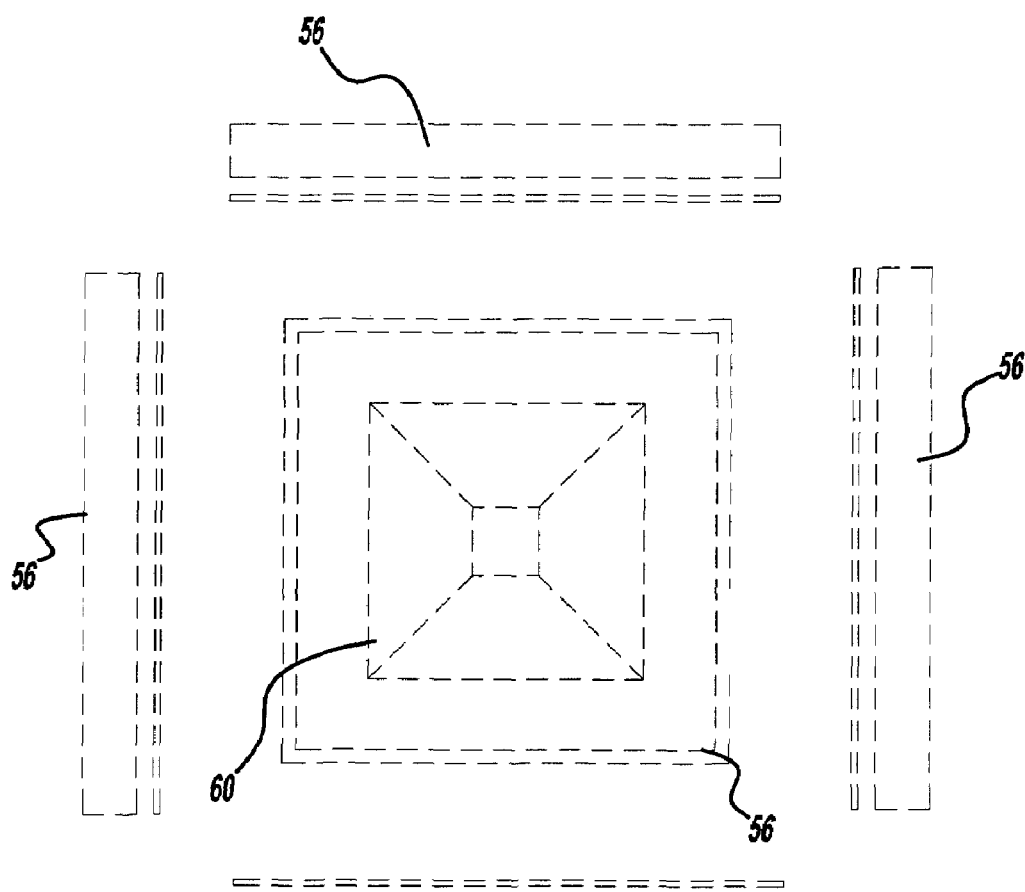

Referring now to FIG. 14, another view of the device 60 is shown. The light collector 60 may be solid or hollow. Some size ratios are shown for one embodiment of the present invention. Again, light is directed in the direction indicated by arrow 132. FIG. 15 shows a still further view of the device of FIG. 14. As seen, an LED panel 56 may be located beneath the pyramid 60.

Figure 16:
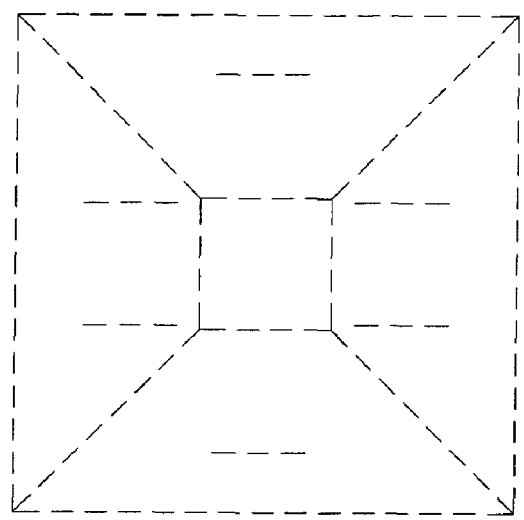
Figure 17:
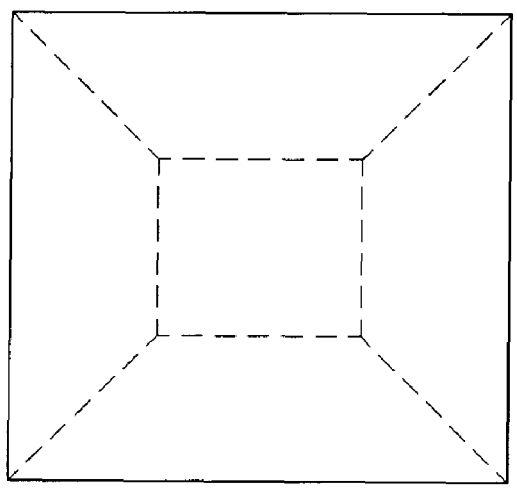
Figure 18A:
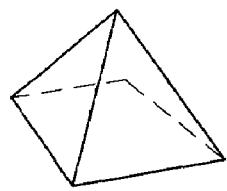
Figure 18B:
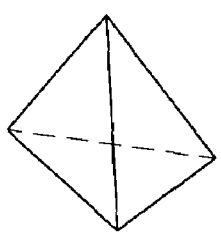
Figure 18C:
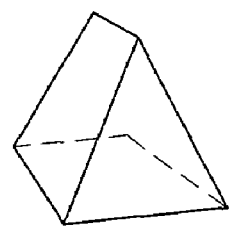

FIG. 16 shows how fresnel lenses may be used to distribute light over areas where coverage by the LED panels would be insufficient. It should be understood that in some embodiments, trapezoidal shaped LED panels may be used to provide better coverage of the target area (display surface, mirror, image panel, etc . . . ) as indicated by FIG. 17. Other embodiments of the light collector 60 may also be used as seen in FIGS. 18A–18C. FIG. 18A shows a square pyramid. FIG. 18B shows a triangular based pyramid. FIG. 18C shows a "pup" tent configuration. These configuration may be but are not limited to being solid or hollow or made of panels of reflective material. They may also be coated with film or other material so that all reflective surfaces contacted by light have the same index of refraction. As a nonlimiting example, if the base layer has 1.5 index, then all the other surfaces will be configured to have a 1.5 index.

Figure 19:
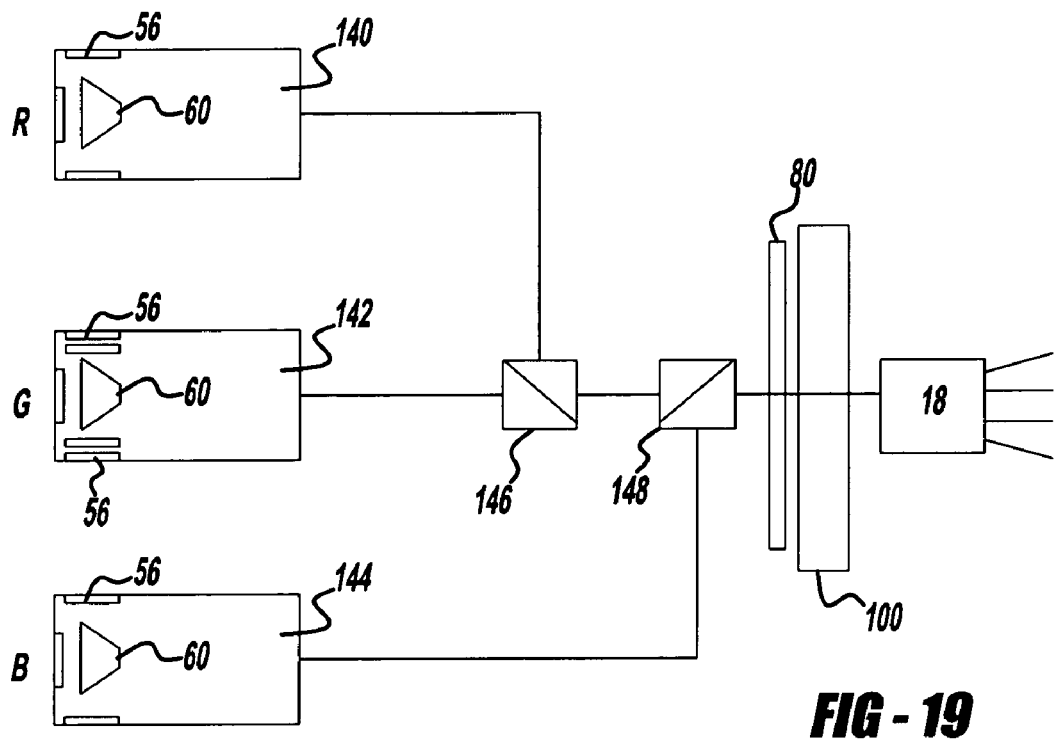
Figure 20:
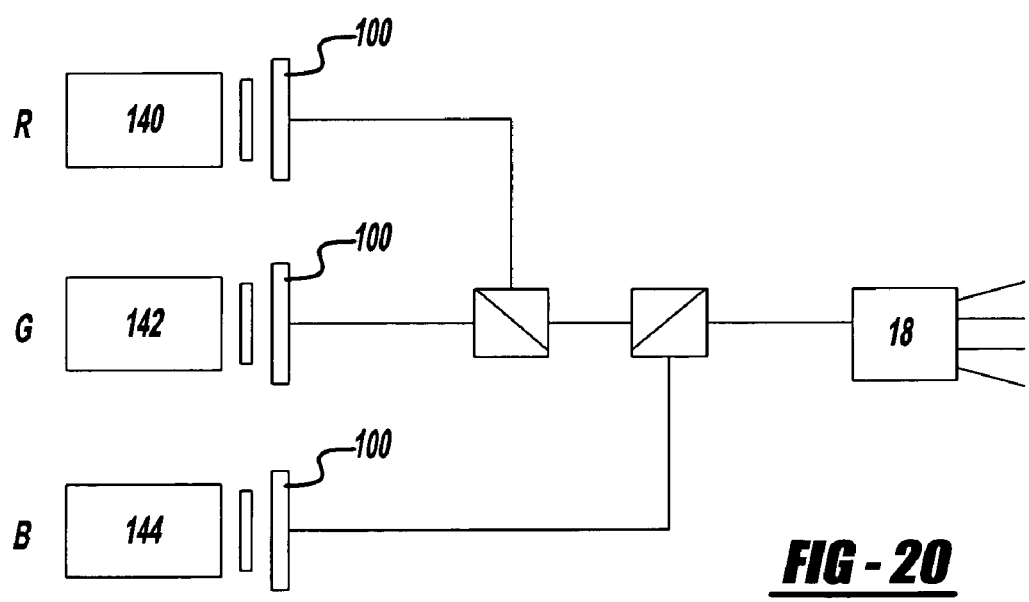

Referring now to FIG. 19, yet another embodiment of the present invention comprises using 3 modules or arrays each having at least one light source, a plurality of fresnels, and then the repolarizer. Dichroic mirrors may be used to bring the beams together in a collimated form. In one embodiment, the first 6 element above (see text for FIG. 2) may be repeated, once for each color: red, green, blue as indicated by reference numerals 140, 142, and 144. The light of each color is then combined prior to the LCD using dichroic mirrors 146 and 148. Each module or array for each color may optionally include the light collector. This design advantageously allows each color component to be adjust for but not limited to brightness, contrast, and other features on an individual basis. In one embodiment, brightness may be adjusted by adjusting amperage. FIG. 20 shows a still further design where LCD panels are associated with each array of light sources.

While the invention has been described and illustrated with reference to certain particular embodiments thereof, those skilled in the art will appreciate that various adaptations, changes, modifications, substitutions, deletions, or additions of procedures and protocols may be but is not limited to made without departing from the spirit and scope of the invention. For example, with any of the above embodiments, additional light sources may be but is not limited to used with the light collection system. The light source could also be used with LCOS and the TI rocking mirrors (DLP). It should be understood that the system may also be used with a standard repolarizer.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be but is not limited to different from the actual publication dates which may need to be independently confirmed. All publications, patents, and patent applications mentioned herein are incorporated herein by reference to disclose and describe the structures and/or methods in connection with which the publications are cited.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Expected variations or differences in the results are contemplated in accordance with the objects and practices of the present invention. It is intended, therefore, that the invention be defined by the scope of the claims which follow and that such claims be interpreted as broadly as is reasonable.

What is claimed is:

1. A light collection system comprising:
   means for collecting light, said means having a plurality of surfaces; and
   a plurality of light sources being capable of producing output light and positioned to direct said output light toward said means for collecting light, wherein said plurality of light sources comprise a panel of LEDs and a plurality of parabolic concentrators positioned to direct said output light from the LEDs towards the means for collecting light;
   wherein said surfaces direct said output light from said light sources in a direction towards a target area, wherein one of said plurality of light sources directs output light through a top portion of the means for collecting light, and wherein said means for collecting light and said plurality of surfaces include optical coatings to create a consistent set of indices of refraction.

2. The system of claim 1 further comprising a housing for positioning said plurality of light sources to direct light toward the means for collecting light.

3. The system of claim 1 wherein said plurality of light sources comprise a panel of LEDs.

4. The system of claim 1 wherein the light sources comprise a plurality of LEDs each being capable of providing between about 1–5 watts at 1 amp.

5. The system of claim 1 wherein the plurality of light sources comprise a plurality of LEDs each being capable of providing at least 80 lumens at 1 amp and 3 watts.

6. The system of claim 1 wherein surfaces of the means for collecting light have a silicon oxide thin film.

7. The system of claim 1 further comprising an image panel, wherein said means for collecting light is used to direct the light toward the image panel.

8. The system of claim 1 wherein:
   a first of said surfaces reflects light from a first of said light sources;
   a second of said surfaces reflects light from a second of said light sources;
   a third of said surfaces reflects light from a third of said light sources; and
   a fourth of said surfaces reflects light from a fourth of said light sources.

9. A light collection system, comprising:
   means for collecting light, said means having a plurality of surfaces, and a plurality of light sources positioned to direct light toward said means for collecting light, wherein said surfaces direct light from said light sources in a direction towards a target area and wherein a light source directs light through the means for collecting light, said light exiting through a top portion of the means for collecting light having a truncated pyramid shape, wherein said means for collecting light and said plurality of surfaces include optical coatings to create a consistent set of indices of refraction.

10. The system of claim 9 further comprising a housing for positioning said light sources to direct light toward the means for collecting light.

11. The system of claim 9 wherein said light sources comprise a panel of LEDs.

12. The system of claim 9 wherein said light sources comprise a panel of LEDs and a plurality of parabolic concentrators positioned to direct light from the LEDs towards the means for collecting light.

13. The system of claim 9 wherein surfaces of the means for collecting light have a silicon oxide thin film.

14. A light collection system comprising:
means for collecting light, said means having a plurality of surfaces,
a plurality of light sources positioned to direct light toward said means for collecting light,
wherein said surfaces direct light from said light sources in a direction towards a target area and wherein a light source directs light through the means for collecting light, said light exiting through a top portion of the means for collecting light having a truncated pyramid shape, and
an image panel, wherein said means for collecting light is used to direct light toward the image panel.

15. A light collection system, comprising:
means for collecting light, said means having a plurality of surfaces, and
a plurality of light sources positioned to direct light toward said means for collecting light,
wherein said surfaces direct light from said light sources in a direction towards a target area and wherein a light source directs light through the means for collecting light, said light exiting through a top portion of the means for collecting light having a truncated pyramid shape, and
wherein:
a first of said surfaces reflects light from a first of said light sources,
a second of said surfaces reflects light from a second of said light sources,
a third of said surfaces reflects light from a third of said light sources, and
a fourth of said surfaces reflects light from a fourth of said light sources.

16. A light collection system comprising:
a light collector, said light collector having a plurality of surfaces and a truncated pyramid shape, and
a plurality of light sources positioned to direct light toward said light collector, wherein said plurality of surfaces direct light from said plurality of light sources in a direction towards a target area and one of said plurality of light sources directs light through the light collector, said light exiting through a top portion of the light collector, and wherein said light collector and said plurality of surfaces include optical coatings to create a consistent set of indices of refraction.

17. The system of claim 16 further comprising a housing for positioning said plurality of light sources.

18. The system of claim 16 wherein said plurality of light sources comprise a panel of LEDs.

19. The system of claim 16 wherein said plurality of light sources comprise a panel of LEDs and a plurality of parabolic concentrators positioned to direct light from the LEDs towards the light collector.

20. The system of claim 16 wherein surfaces of said light collector have a silicon oxide thin film.

21. A light collection system comprising:
a light collector, said light collector having a plurality of surfaces and a truncated pyramid shape,
a plurality of light sources positioned to direct light toward said light collector, wherein said plurality of surfaces direct light from said plurality of light sources in a direction towards a target area and one of said plurality of light sources directs light through the light collector, said light exiting through a top portion of the light collector, and
an image panel, wherein said light collector is used to direct light toward the image panel.

22. A light collection system comprising:
a light collector, said light collector having a plurality of surfaces and a truncated pyramid shape, and
a plurality of light sources positioned to direct light toward said light collector, wherein said plurality of surfaces direct light from said plurality of light sources in a direction towards a target area and one of said plurality of light sources directs light through the light collector, said light exiting through a top portion of the light collector, and
wherein;
a first of said surfaces reflects light from a first of said light sources,
a second of said surfaces reflects light from a second of said light sources,
a third of said surfaces reflects light from a third of said light sources, and
a fourth of said surfaces reflects light from a fourth of said light sources.

* * * * *

UNITED STATES PATENT AND TRADEMARK OFFICE
CERTIFICATE OF CORRECTION

PATENT NO. : 7,237,929 B2 Page 1 of 1
APPLICATION NO. : 10/693329
DATED : July 3, 2007
INVENTOR(S) : Thomas Stahl It is certified that error appears in the above-identified patent and that said Letters Patent is hereby corrected as shown below:

Column     Line 7          28          Please replace "comers " with -- corners--

Signed and Sealed this

Twenty-third Day of October, 2007

JON W. DUDAS
*Director of the United States Patent and Trademark Office*